(No Model.)

C. S. WATKINS.
EARTHENWARE COVER AND HANDLE.

No. 253,329. Patented Feb. 7, 1882.

Witnesses:
W<sup>m</sup> H Babcock
H. A. Daniels.

Inventor:
Charles S. Watkins
By W. Parris
Attorney.

UNITED STATES PATENT OFFICE.

CHARLES S. WATKINS, OF DAVENPORT, IOWA.

EARTHENWARE COVER AND HANDLE.

SPECIFICATION forming part of Letters Patent No. 253,329, dated February 7, 1882.

Application filed November 14, 1881. (No model.)

*To all whom it may concern:*

Be it known that I, CHARLES S. WATKINS, of Davenport, in the county of Scott and State of Iowa, have invented certain new and useful Improvements in Earthenware Covers and Handles; and I do hereby declare that the following is a full, clear, and exact description thereof, which will enable others skilled in the art to which it appertains to make and use the same, reference being had to the accompanying drawings, and to letters of reference marked thereon, which form a part of this specification.

Heretofore earthenware covers or lids have been provided with handles formed separately and attached to the covers after they are formed, which requires more than one operation or process in making a cover and its handle.

My invention consists of an earthenware cover having a handle formed on and simultaneously with the cover and in the same process in which the cover is formed, as hereinafter fully described.

Figure 1:
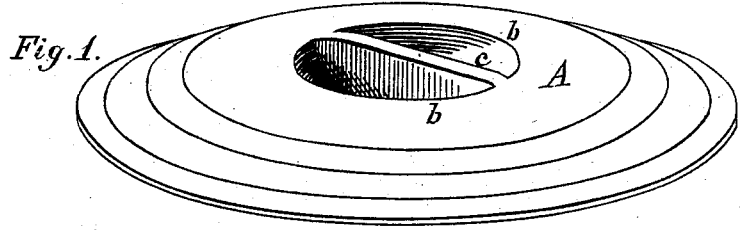
Figure 2:
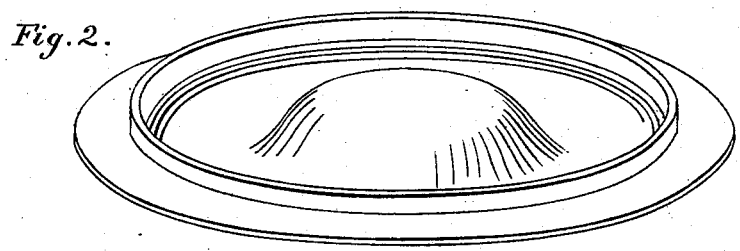
Figure 3:
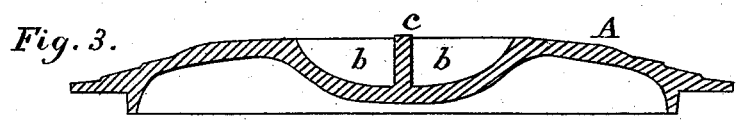
Figure 4:
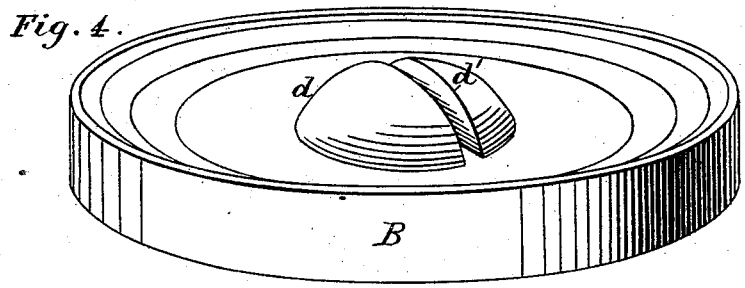
Figure 5:
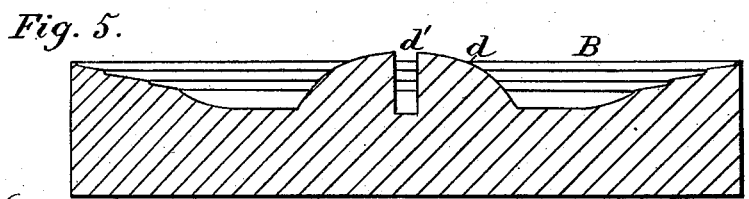
Figure 6:
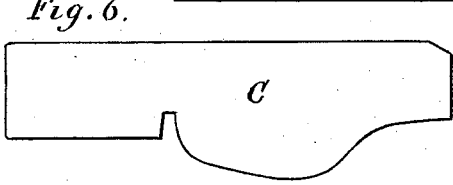
Figure 7:
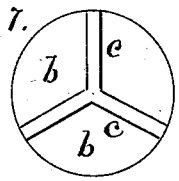
Figure 8:
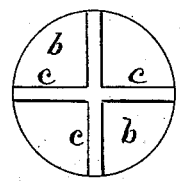

In the drawings, Figure 1 is a perspective of the upper side, and Fig. 2 is a perspective of the under side, of one of my improved covers. Fig. 3 is a transverse sectional view of the same. Fig. 4 is a perspective of the mold for forming the upper side of the cover and the handle thereon. Fig. 5 is a transverse sectional view of the mold. Fig. 6 is a side view of the tool used in forming the under side of the cover. Figs. 7 and 8 show modifications of the form of the handle.

A represents one of my improved covers, provided on the upper side with cavities $b\ b$, separated by a partition, $c$, forming a handle depressed below or even with the surface of the cover. This side of the cover is formed by a mold, B, provided in the central part with the convexity $d$, having diametrically through its center a groove, $d'$, with vertical walls, which convexity and groove form the concavities $b\ b$ and the partition $c$.

C represents the tool, of such size and configuration as may be required for forming the under side of the cover. The handle may be straight or curved, and may consist of cross-partitions, as shown in Figs. 7 and 8 of the drawings.

In forming the cover the mold B is adjusted upon a potter's wheel, and the plastic clay being placed upon the mold, the tool C is applied while the wheel is revolved, and the pressure required in forming the under side of the cover by the tool presses the clay upon the mold sufficiently to form completely the upper side of the cover and the handle thereon, thus forming simultaneously and by the one process the cover and its handle.

What I claim as new, and desire to secure by Letters Patent, is—

1. An earthenware cover or lid provided with the cavities $b\ b$ and the partition $c$, forming the handle molded on and with the cover, substantially as described.

2. The mold B, provided with the convexity $d$, having the groove $d'$ for forming the upper side of an earthenware cover and the handle thereon, substantially as described.

In testimony that I claim the foregoing as my own invention I affix my signature in presence of two witnesses.

CHARLES S. WATKINS.

Witnesses:
ABNER DAVISON,
JOE R. LANE.